United States Patent [19]

Jördens et al.

[11] Patent Number: 4,730,584
[45] Date of Patent: Mar. 15, 1988

[54] ENGINE MOUNT CONSTRUCTION

[75] Inventors: Ernst-Günter Jördens, Damme; Jöhannes Sprute, Osnabruck, both of Fed. Rep. of Germany

[73] Assignee: Lemförder Metallwaren AG, Fed. Rep. of Germany

[21] Appl. No.: 33,524

[22] Filed: Apr. 1, 1987

[30] Foreign Application Priority Data

Apr. 26, 1986 [DE] Fed. Rep. of Germany ....... 3614161

[51] Int. Cl.⁴ ............................ F16F 9/10; B60K 5/12
[52] U.S. Cl. .................................. 123/192 R; 248/550; 248/566; 248/636; 180/300; 188/298; 267/140.1
[58] Field of Search ....................... 123/192 R, 195 A; 248/550, 566, 636; 180/312, 300; 188/298, 299; 267/140.1, 8 D, 141.2, 141.3, 141.4

[56] References Cited

U.S. PATENT DOCUMENTS

| | | | |
|---|---|---|---|
| 4,418,895 | 12/1983 | Bertin et al. | 180/298 |
| 4,492,366 | 1/1985 | Ozawa et al. | 180/312 |
| 4,516,545 | 5/1985 | Kumagai et al. | 123/192 R |
| 4,531,484 | 7/1985 | Kimura et al. | 123/192 R |
| 4,537,275 | 8/1985 | Kimura et al. | 123/192 R |
| 4,583,503 | 4/1986 | Kumagai et al. | 123/192 R |
| 4,648,576 | 3/1987 | Matsui | 180/300 |
| 4,671,227 | 6/1987 | Hollerneger et al. | 123/192 R |

FOREIGN PATENT DOCUMENTS 2558229   7/1985   France .......................... 123/192 R

*Primary Examiner*—Ira S. Lazarus
*Attorney, Agent, or Firm*—McGlew and Tuttle

[57] ABSTRACT

A dual-chamber support bed or motor vehicle engine mount with hydraulic cushioning includes a resilient housing part and a support base for use in defining a working chamber and compensating chamber filled with liquid, the housing walls are annular rubber diaphragms with a buckling characteristic that is adjustable to adapt to the operating load. The chambers are connected to one another through a nozzle channel. Means for controlling the buckling characteristics (buckling rigidity) are provided in a wall of the working chamber and in a preferred embodiment include an additional buckling spring that is clamped into the fixed base housing and is adjustable in its buckling behavior from the exterior by a spindle.

10 Claims, 3 Drawing Figures

Buckling spring
adjustment
1.) soft
2.) medium
3.) hard

ENGINE MOUNT CONSTRUCTION

BACKGROUND OF THE INVENTION

Field of the Invention

This invention relates in general to the support mounts and in particular to a new and useful motor vehicle engine mount having hydraulic cushioning.

Engine mounts with these features are disclosed by German Patent Application Disclosure No. 34 10 781. It has a nozzle channel in a rigid partition that separates the upper working chamber from the compensation chamber located below it. The cushioning characteristics of the mount can be adjusted by forming the nozzle channel from recesses open against one another in two disks that can rotate around a vertical axis. The disks are brought together when installing the amount in a position aligned for individual cushioning. No further adjustment is possible after installing the mount. However, the linear behavior of the mount can be adjusted over the entire frequency range in this way. The decoupling of vibrations with very small amplitudes is also known from this by a section of wall with elastic rubber mount that can give way against the external atmosphere, but with the resistance force building up proportionally and with the efficiency of the decoupling being limited to very small amplitudes.

Finally, nozzle channels between the two chambers of an engine mount are known with flow rates continuously controllable electronically to control the cushioning characteristics of the engine mount. However, the necessary technical expense exceeds by far the costs of a mount pursuant to the publication mentioned first.

SUMMARY OF THE INVENTION

The invention provides a large-area decoupling of both amplitudes in dual-chamber support beds and this decoupling an be controlled continuously.

It is an outstanding advantage that the invention makes it possible to control the buckling characteristics of the support mount even after the installation of the mount, so that a continuous adaptation of the cushioning characteristics to changing operating states can be carried out by constant adjustment. For this purpose, sensors in the vehicle can optionally transmit the operating state to the control element for the buckling characteristics in the mount by means of regulating units. Manual adaptation to a desired behavior is also possible at any time in this way.

In a preferred form of embodiment, the compensating chamber extends annually around a central working chamber, with the means for controlling the buckling characteristics being located in a base section of the working chamber wall freely accessible from the outside. In such a design, the nozzle channel is located in an annular support element that is connected securely to the annular rubber diaphragm of the wall of the working chamber and to a flat base section. Because of this, the base section is freely accessible from the outside and is thus suitable for holding adjustable means for controlling the buckling characteristics of the walls of the working chamber.

In accordance with the invention, there is another buckling spring including a diaphragm in this rigid base section of the working chamber that is clamped in by its edge and is adjustable in its buckling behavior. It is preferable for one buckling spring to include a round diaphragm disk whose clamping at the edge is adjustable in diameter from the outside by a regulating unit. By changing the clamping diameter, the buckling characteristics of the additional buckling spring can thus be determined. In a further refinement of the invention, this additional buckling spring in the form of a diaphragm disk is clamped in at the edge between two adjustable thrust collars separated axially from one another, with the clamping surfaces of the two thrust collars forming an angle with the central plane of the diaphragm disk with the vertex pointing toward the outside.

It is preferred for clamping surfaces of the thrust collars to be curved in cross section, with the distance from the central plane of the diaphragm disk increasing from the outside toward the inside. One thrust collar is anchored securely in the housing, while the other collar is adjustable from the outside relative to the fixed thrust collar by means of a screw. The clamping diameter can thus be varied by the surface contour of the clamping surface contacting the diaphragm disk to control the buckling behavior of the diaphragm disk. According to another idea for operation, a screw with an operating element extending laterally outward is provided, to which can be linked either automatic control elements or a lever for manual control. Another particular feature of the invention is found in the placement of a reinforcing insert in the diaphragm disk, by which the diaphragm disk can be adjusted to preset operating conditions. This reinforcing insert can be rigid or can be provided with its own elasticity characteristic.

Accordingly, it is an object of the invention to provide a support mounting especially an engine mount for motor vehicles which includes a base housing covered at one end by a resilient housing having spaced apart resilient walls and which defines a working chamber with said base housing and a compensating chamber between two portions of the walls thereof which are interconnected by a nozzle channel and wherein means are provided in a wall bounding the working chamber for controlling the buckling behavior of the working chamber.

A further object of the invention is to provide a support mount which is simple in design, rugged in construction and economical to manufacture.

GENERAL DESCRIPTION OF THE PREFERRED EMBODIMENT

Figure 1:
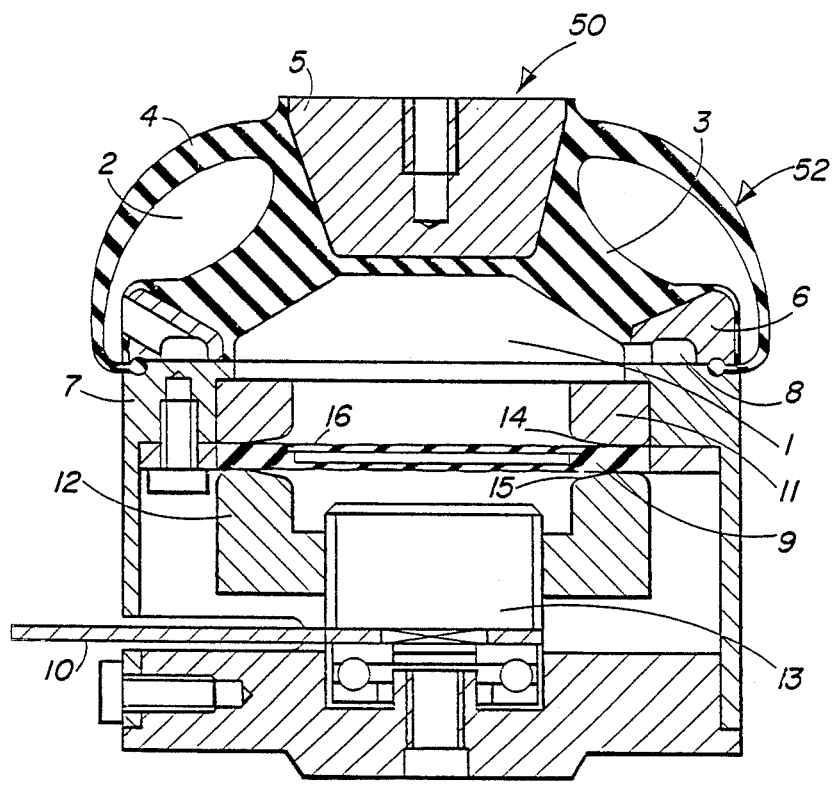
FIG. 1, is a axial sectional view of a motor vehicle engine mount constructed in accordance with the invention.

Shown in FIG. 1 comprises an engine mount for a motor vehicle in which an engine support element 5 is connected to the motor vehicle which is supported on a mount generally designated 50 which includes a cylindrical base portion 7 having an open end which is covered by a resilient material housing 52 which is bonded, for example vulcanized to a component member or ring 6. The ring 6 overlies an outer marginal portion of the resilient housing 52 in the area of an outer wall 4 which is based outwardly from an inner wall 3 and defines a compensating chamber 2 there between.

FIG. 1 shows a dual-chamber support bed with hydraulic or blend pressure cushioning, especially an engine mount support 50 in motor vehicles, having walls 3 and 4 defining a working chamber 1 filled with liquid and compensating chamber 2. The walls 3 and 4 are made of annular rubber diaphragms. The compensating chamber 2 extends annularly around the central working chamber 1 so that the rubber diaphragms forming the walls 3 and 4 can have a one-piece housing 52. This rubber object is connected securely to the upper, centrally located engine support element 5, which can be fastened to the engine or to another supporting component. The free end of the rubber diaphragm forming the wall 3 of the working chamber 1 is connected securely to a second support element 6, that can be secured by threaded connection to an annular base section 7 of the working chamber and has an annular recess forming a fluid flow channel 8 in the parting plane that forms the nozzle channel between the two chamber 1 and 2. The free edge of the rubber diaphragm of the compensating chamber forming the wall 4 is clamped between the support element 6 and the base section 7.

There is a buckling spring of a round diaphragm disk 9 in the base section 7, having an edge which is clamped in the base 7 and the clamping force can be adjusted in diameter by a regulating unit or control lever 10 from the outside. The buckling spring 9 is clamped at the edge between two thrust collars 11 and 12 adjustable in axial separation from one another. One thrust collar 11 is place securely in the base section 7, while the other collar 12 is adjustable relative to the thrust collar 11 by means of a screw 13 in the direction of its vertical axis.

Figure 2:
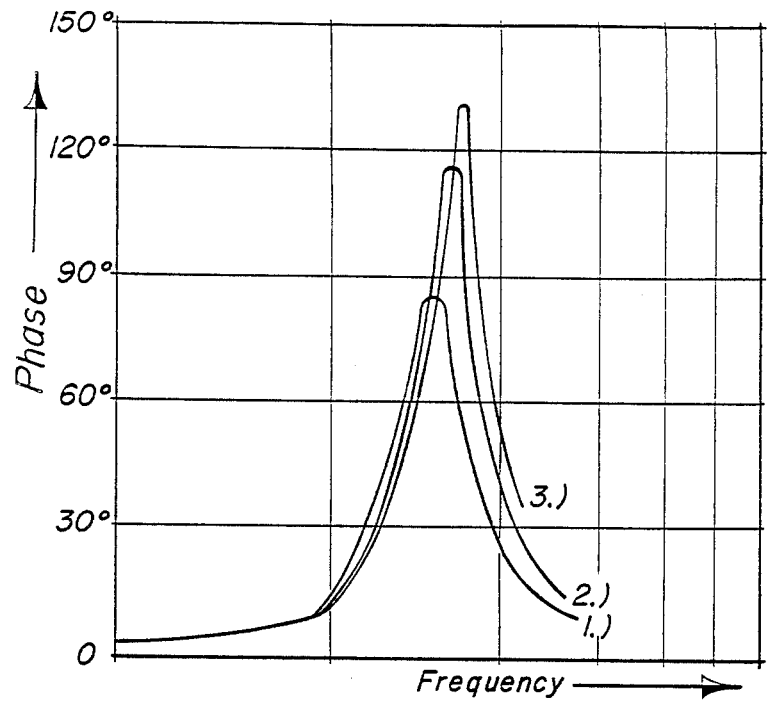
FIG. 2, is a curve indicating variations of vibration phase and frequency.
Figure 3:
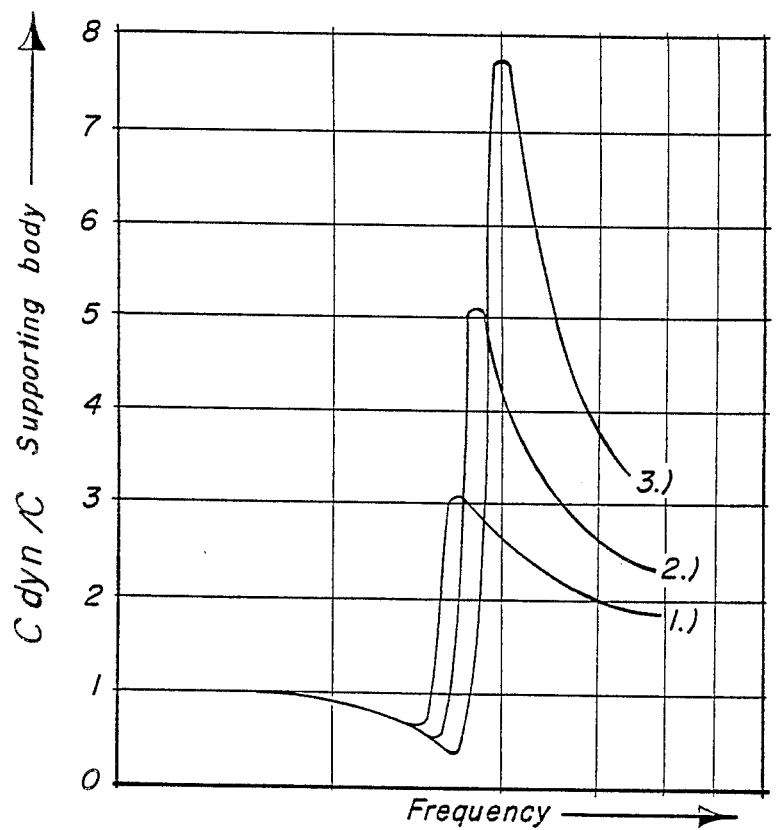
FIG. 3, is a curve indicating variation of buckling rigidity with frequency.

The clamping surfaces 14 and 15 of the two thrust collars 11 and 12 form an angle with the central plane of the buckling spring 9 with the vortex pointing outward. It is beneficial for these clamped surfaces to have a curved design so that the distance remaining between the clamped surfaces 14 and 15 becomes larger from the outside toward the inside, i.e., the distance of the curved clamped surfaces from the central plane of the buckling spring 9 increases from the outside toward the inside. The thrust collar 12 can be moved toward the fixed thrust collar 11 by turning the screw 13 by means of the regulating unit 10, to reduce the clamping diameter of the buckling spring 9, or with the opposite motion of the thrust collar 12, to increase it. The change of the buckling rigidity of the diaphragm walls of the working chamber 1 caused by this is shown in the diagrams according to FIG. 2 and FIG. 3. A variable vibration phase of the buckling spring 9 can be set at approximately the same frequency by adjusting the thrust collar 12 (FIG. 2). The diaphragm in FIG. 3 shows the buckling spring setting in several steps from soft to hard. The behavior of the buckling spring 9 shown here can also be controlled by an inserted vibrating mass 16, with this mass 16 embedded in the material of the buckling spring consisting of an essentially rigid reinforcing insert, for example, or of an elastic material that has a specific gravity differing from the material of the buckling spring and/or a hardness differing from it. A buckling spring with a rigid central section and an elastic boundary zone that is clamped in between the thrust collars 11 and 12 would be equivalent; the clamped surfaces can also be flat as an alternative to the curved clamped surfaces of the thrust collars as in FIG. 1.

What is claimed is:

1. A dual chamber support bed having a fluid cushioning, especially a motor mount support for motor vehicles, comprising a base housing having a side wall with an opening at one end, a resilient material housing overset opening and secured to said base housing and having spaced apart resilient inner and outer annular walls be positioned over and connected to the open end of said base housing and defining a working chamber between said base housing and said resilient material housing and a compensating chamber between said inner and outer wall, the chambers being filled with a fluid, said inner and outer walls having a buckling characteristic controllable to adapt to variations of supporting load, means defining a nozzle chamber between said base housing and said resilient material housing and inter-connecting said compensating chamber and said working chamber, and a means in said working chamber for controlling the buckling characteristic of said resilient material housing.

2. A dual chamber support that according to claim 1 wherein said compensating chamber comprises an annular chamber or extending around said working chamber wherein said means for controlling the buckling characteristics are located in said base housing, and means movable from the exterior of said base housing for varying said control means.

3. Dual chamber support bed according to claim 1 wherein said means for controlling the buckling characteristics of said working chamber comprises a diaphragm secured to said base section, and including means clamping said diaphragm on each side thereof in a position stretching across said base housing at one end of said working chamber, said clamping means being adjustable to vary the buckling behavior.

4. A dual chamber support according to claim 3 wherein said diaphragm comprises a buckling spring which comprises a round diaphragm disk said means engages over a marginal portion of the edge of said disk, said clamping means including a rotatable member and a clamping element carried by said rotatable member and being movable upon rotation thereof.

5. A dual chamber support bed according to claim 4 wherein said clamping means includes collar engaged with said spring at the edge of said disk from each side thereof and wherein said adjustment means includes a spindle carrying one of said clamping elements for varying the position of said element in respect of said disk, said clamping element having a surface extending at an angle to the plane of said disk.

6. A dual-chamber support bed according to claim 5 wherein each of said clamping elements on respective sides of said disk of clamping surfaces which are curved in cross-section and the engaged said disk from respective opposite sides and are curved such that the difference from the central plane of said disk increases from the outside toward the inside of said surface.

7. A dual-chamber support bed according to claim 1 wherein the spindle is rotatably supportive in said base portion, clamping member threadably engaged on said spindle supporting one end of said disk on clamping means including an opposite element in the form of a collar engaged with the opposite surface of said disk and retained in position by said base housing and including a lever engaged with said spindle member for rotating said spindle member from the exterior of said base housing or shifting it axially in respect to said disk.

8. A dual-chamber support according to claim 7 including a lever member extending outwardly of said housing and connected to said spindle member for rotating said spindle member.

9. A dual-chamber support bed according to claim 1 wherein said means for varying the buckling rigidity of said resilient housing parts comprises a buckling spring mounted in said base portion and forming a boundary of one side of said working chamber and including a vibrating mass inserted in the material of said buckling spring.

10. A dual-chamber support bed according to claim 9 wherein inserted mass has a form of a rigid reinforcement.

* * * * *